(12) United States Patent
Dwivedi

(10) Patent No.: US 12,293,060 B1
(45) Date of Patent: May 6, 2025

(54) MACHINE LEARNING MODEL ACCESS CONTROL

(71) Applicant: Interactive Aristotle, Inc., Burlingame, CA (US)

(72) Inventor: Abhijeet Dwivedi, Burlingame, CA (US)

(73) Assignee: Interactive Aristotle, Inc., Burlingame, CA (US)

( * ) Notice: Subject to any disclaimer, the term of this patent is extended or adjusted under 35 U.S.C. 154(b) by 0 days.

(21) Appl. No.: 18/897,356

(22) Filed: Sep. 26, 2024

Related U.S. Application Data

(60) Provisional application No. 63/571,887, filed on Mar. 29, 2024.

(51) Int. Cl.
G06F 3/0482 (2013.01)

(52) U.S. Cl.
CPC ................. G06F 3/0482 (2013.01)

(58) Field of Classification Search
CPC . G06F 3/048–05; G06N 3/0475; G06N 20/00
See application file for complete search history.

(56) References Cited

U.S. PATENT DOCUMENTS

| | | | | |
|---|---|---|---|---|
| 8,548,447 | B1 * | 10/2013 | Kirchhoff | H04M 3/42059 379/211.02 |
| 10,169,450 | B2 * | 1/2019 | Allen | G06F 40/30 |
| 11,468,545 | B1 * | 10/2022 | Peric | G06V 10/34 |
| 11,995,180 | B1 * | 5/2024 | Cappel | G06F 21/55 |
| 12,106,205 | B1 * | 10/2024 | Jain | G06N 3/084 |
| 12,111,747 | B1 * | 10/2024 | Jain | G06F 8/41 |
| 12,142,027 | B1 * | 11/2024 | Saraee | G06V 10/82 |
| 2010/0070542 | A1 * | 3/2010 | Feinsmith | G06Q 10/10 707/812 |
| 2019/0347181 | A1 * | 11/2019 | Cranfill | G06F 11/3013 |
| 2020/0019882 | A1 * | 1/2020 | Garg | G06F 21/6218 |
| 2023/0107086 | A1 * | 4/2023 | Chen | G06F 16/9577 75/234 |
| 2023/0251877 | A1 * | 8/2023 | Carbune | G06F 9/451 715/708 |
| 2023/0422126 | A1 * | 12/2023 | Ali-Tolppa | H04W 36/0085 |
| 2024/0127510 | A1 * | 4/2024 | Darabi | G06T 11/60 |
| 2024/0143941 | A1 * | 5/2024 | Wu | G06N 3/044 |
| 2024/0220067 | A1 * | 7/2024 | Gelfenbeyn | G06F 3/04815 |
| 2024/0330766 | A1 * | 10/2024 | Hard | G06N 20/00 |
| 2024/0333749 | A1 * | 10/2024 | Nabeel | H04L 63/1433 |
| 2024/0411751 | A1 * | 12/2024 | Radmilac | G06F 16/2433 |
| 2024/0412856 | A1 * | 12/2024 | Mensch | G16H 40/20 |
| 2024/0419976 | A1 * | 12/2024 | Gross | G06N 3/0895 |

\* cited by examiner

*Primary Examiner* — Daniel Rodriguez
(74) *Attorney, Agent, or Firm* — Cognition IP, P.C.; Edward Steakley

(57) ABSTRACT

Methods, systems, and apparatus, including computer programs encoded on computer storage media for distribution and access control of distributed machine learning models. The system is configured for the distribution and access control of distributed machine learning models. A server provides for the generation and display of one or more user interfaces allowing a primary user to configure control parameters for access of the distributed machine learning model by a secondary user. In some examples, the distributed machine learning model is a trained generative AI model, such a large language model.

22 Claims, 12 Drawing Sheets

800
Parental Setting > Stats > Interest Modules

*Interest Modules*

1. Animals and their habitats
2. Dinosaurs and prehistoric life
3. Space, planets, and the universe
4. Human body and anatomy
5. History, including ancient civilizations and famous historical figures
6. Geography, maps, and countries
7. Weather and natural disasters
8. Plants, gardening, and ecosystems
9. Art techniques and famous artists
10. Music instruments and genres
11. Sports, athletes, and famous sports events
12. Science experiments and discoveries
13. Technology, gadgets, and inventions
14. Literature, including favorite books and authors
15. Fairy tales, myths, and legends from different cultures
16. Cooking and baking recipes
17. Environmental conservation and sustainability
18. Different cultures, traditions, and festivals around the world
19. Languages and basic phrases from other countries
20. Mathematics, including arithmetic, geometry, and puzzles
21. Famous landmarks and monuments
22. How things are made, such as cars, airplanes, or toys
23. Community helpers and professions
24. Vehicles, transportation, and modes of travel
25. Robotics and artificial intelligence
26. Ocean life and marine biology
27. Insects, bugs, and spiders
28. Magic tricks and illusions
29. Volcanoes, earthquakes, and geological formations
30. DIY crafts and creative projects

[+] Add more

FIG. 8

MACHINE LEARNING MODEL ACCESS CONTROL

CROSS-REFERENCE TO RELATED APPLICATIONS

This application claims the benefit of priority to U.S. Provisional Application No. 63/571,887, filed on Mar. 29, 2024, which is hereby incorporated by reference in its entirety.

FIELD

This patent application relates generally to operation control of machine learning models, and more particularly, to systems and methods for distribution and access control for distributed machine learning models.

SUMMARY

In some embodiments, systems and methods provide for the distribution and access control for distributed machine learning models. A server provides for the generation and display of one or more user interfaces allowing a primary user to configure control for access to a distributed machine learning model by a secondary user. In some examples, the distributed machine learning model is a trained generative AI model, such a large language model (LLM). This system is especially useful in the context of setting up parental controls for use of a generative AI model by a child or teenager.

In some embodiments, the one or more user interfaces provide functionality where the primary user may set control parameters that are later used by the secondary user for a client device to control access to a machine learning model that is distributed to the client device. The client device applies the control parameter to input received by the client device. The client device determines whether any of the control parameters apply to one or more inputs received by the client device. If any of the control parameters apply to the one or more inputs received by the client device, then client device displays a control parameter response that is associated to a control parameter that applies to the received input. In such a case, the client device does not provide the received input as a prompt or input the machine learning model.

In some embodiments, the client device intermittently sends or transmits to the server, a topic context, a word graph and/or a word tree related to the inputs received by the client device. The server may generate a graph for display, via a user interface, that allows the primary user to view a word graph of the inputs made into the client device by the secondary user.

In some embodiments, the client device intermittently sends or transmits to the server a word graph or word tree related to the input received by the client device. The server may determine based on the received word graph or word tree, that the secondary user has an interest in a topic of information. The server may apply data related to the topic to a copy of the machine learning model that was distributed to the client device. The server may store specific machine learning models that have been updated with information. These specific machine learning models may be associated to a primary user identifier and/or a second user identifier. In some embodiments, the system must receive approval by the primary user, before the system distributes the updated machine learning model to the client device.

In some embodiments, the server receives, via a user interface, user configuration information about an age or age range of the secondary user. Different machine learning models that have been trained with age-appropriate information may be associated with an age. Based on the secondary user age or age range, the system may select one of the different machine learning models to distribute to the client device.

In some embodiments, the server determines that an age or age range of the secondary user has increased. Based on the determination of the age increase, the system distributes to the secondary user client device, a new machine learning model that is associated with an age corresponding to the increased age of the secondary user. In some embodiments, the system must receive approval by the primary user before the system distributes the new machine learning model to the client device.

The appended claims may serve as a summary of this application.

BRIEF DESCRIPTION OF THE DRAWINGS

FIG. 8 is a diagram illustrating an exemplary user interface.

DETAILED DESCRIPTION OF THE DRAWINGS

Figure 1A:
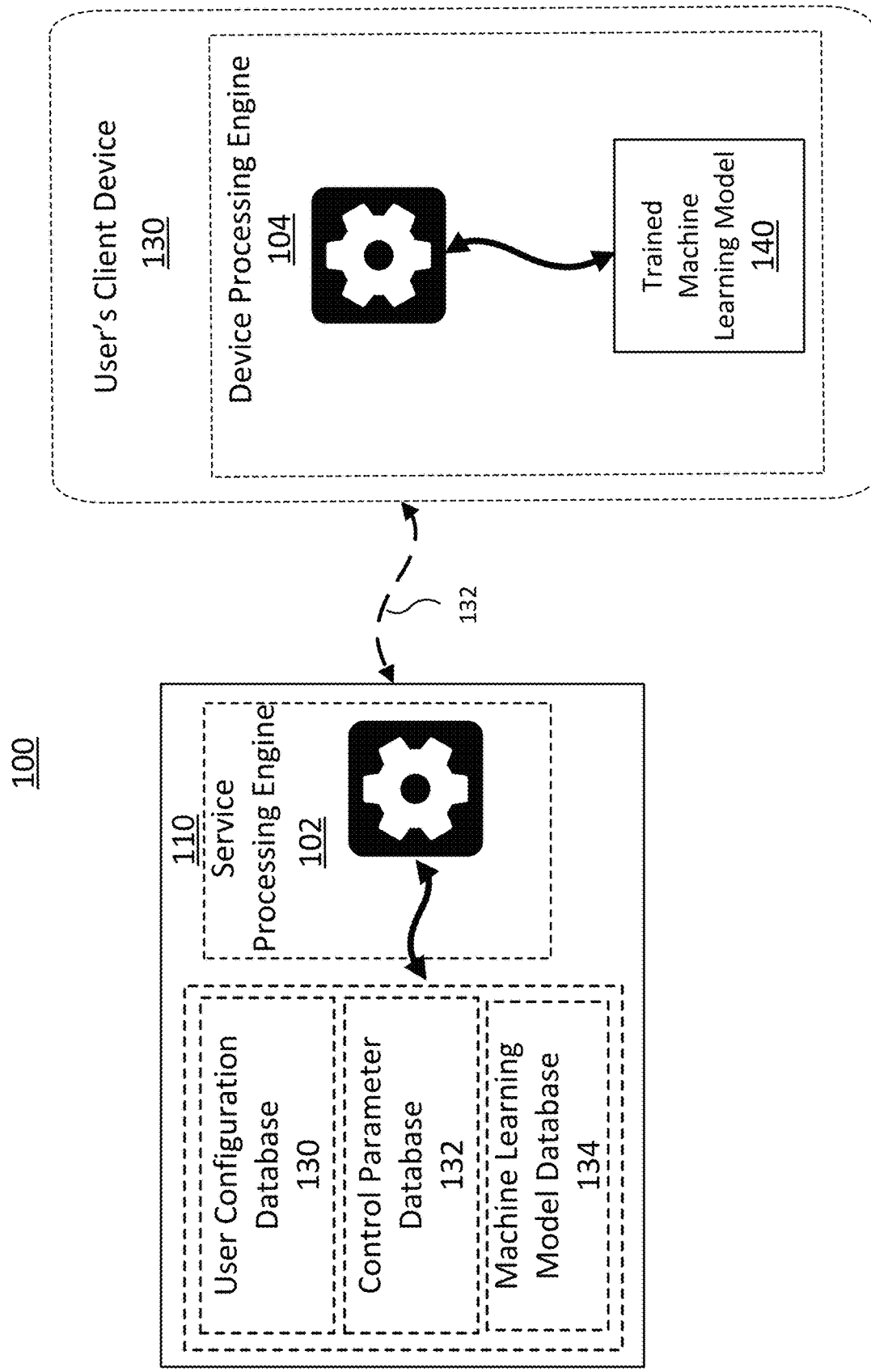
FIG. 1A is a diagram illustrating an exemplary environment in which some embodiments may operate.

In this specification, reference is made in detail to specific embodiments of the invention. Some of the embodiments or their aspects are illustrated in the drawings.

For clarity in explanation, the invention has been described with reference to specific embodiments, however it should be understood that the invention is not limited to the described embodiments. On the contrary, the invention covers alternatives, modifications, and equivalents as may be included within its scope as defined by any patent claims. The following embodiments of the invention are set forth without any loss of generality to, and without imposing limitations on, the claimed invention. In the following description, specific details are set forth in order to provide a thorough understanding of the present invention. The present invention may be practiced without some or all of these specific details. In addition, well known features may not have been described in detail to avoid unnecessarily obscuring the invention.

In addition, it should be understood that steps of the exemplary methods set forth in this exemplary patent can be performed in different orders than the order presented in this specification. Furthermore, some steps of the exemplary methods may be performed in parallel rather than being performed sequentially. Also, the steps of the exemplary methods may be performed in a network environment in which some steps are performed by different computers in the networked environment.

Some embodiments are implemented by a computer system. A computer system may include a processor, a memory, and a non-transitory computer-readable medium. The memory and non-transitory medium may store instructions for performing methods and steps described herein.

FIG. 1A is a diagram illustrating an exemplary environment in which some embodiments may operate. In the exemplary environment 100, a user's client device 130 and one or more additional users' client device (not shown) are in communication with one or more servers 110 including a service processing engine 102. The user's client device 130 communicates with the server 110 via communications link 132. The additional users' client devices communicate with the server 110 via their respective communication links. The client devices may interact with one or more websites (e.g., web services) running a code or a service for interaction with the service processing engine 102.

The user's client device 130 and additional users' client device(s) may be devices with a display configured to present information to a user of the device. In some embodiments, the user's client device 130 and additional users' client device(s) present information in the form of a user interface (UI) with UI elements or components. In some embodiments, the user's client device 130 and additional users' client device(s) send and receive signals and/or information to the service processing engine 102.

In some embodiments, the user's client device 130 and additional users' client device(s) are computing devices capable of hosting and executing one or more applications or other programs capable of sending and/or receiving information. In some embodiments, the user's client device 130 and/or additional users' client device(s) may be a computer desktop or laptop, mobile phone, tablet, or any other suitable computing device capable of sending and receiving information.

The service processing engine 102 is connected to one or more repositories (e.g., non-transitory data storage) and/or databases, including a user configuration database 130 for storing and retrieving user information, a control parameter database 132 for storing and retrieving control parameters associated with a machine learning model, and a machine learning database 134 for storing versions of different machine learning models, such a generative AI model, including a large language model.

The one or more servers 110 are in communication with multiple client devices 130. A client device 103 includes a device processing engine 104. The client device 130 may receive control parameter data from the server 110. The client device 130 may receive one or more versions of machine learning models from the server.

In an embodiment, the device processing engine 104, the service processing engine 102 and a client device 130 may perform the method 200, 300, 400 other methods described herein and, as a result, provide for a system and method for distribution and access control for distributed machine learning models. The device processing engine 104 interacts with one or more trained machine learning models 140.

Figure 1B:
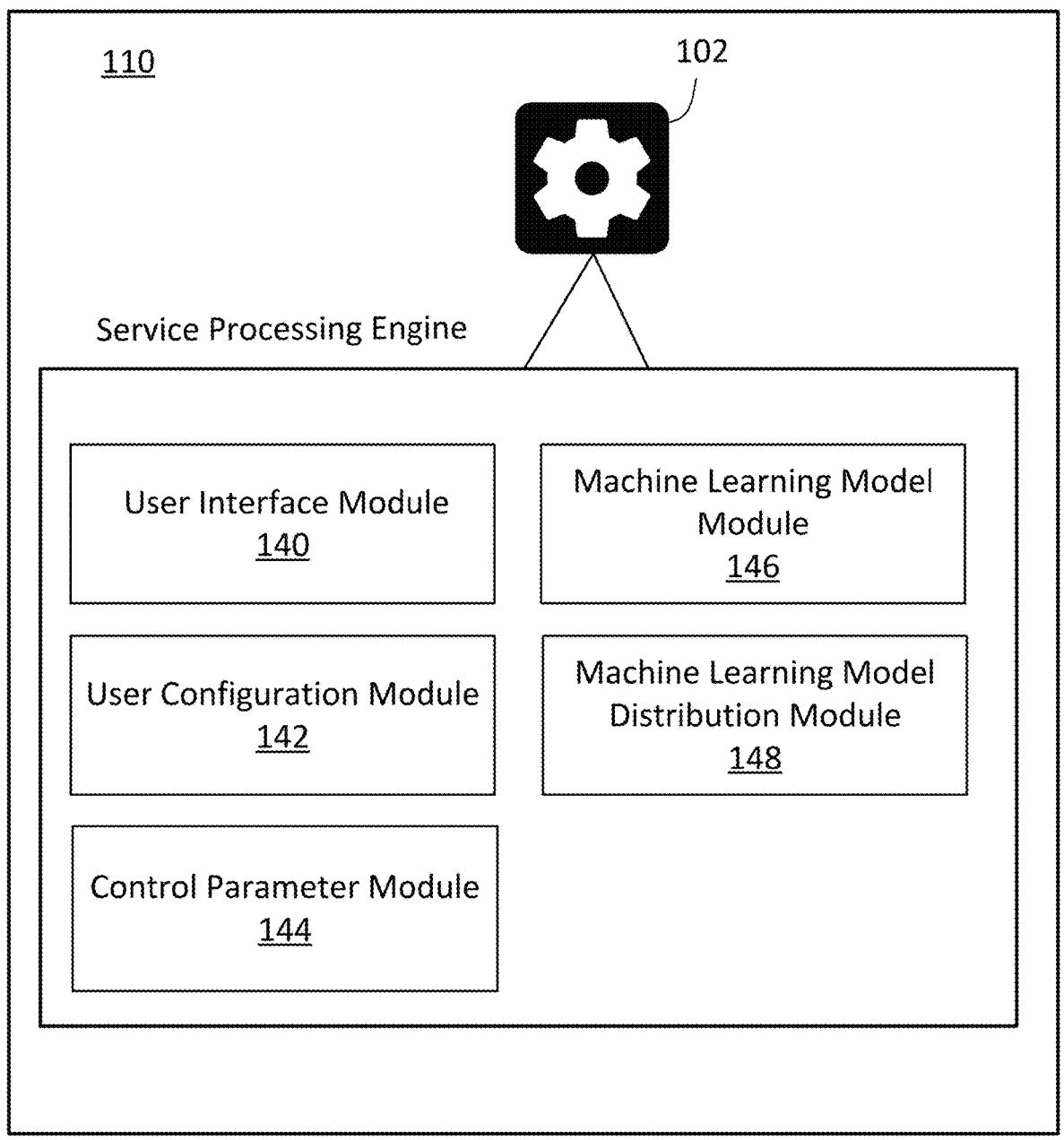
FIG. 1B is a diagram illustrating an exemplary computer system with software and/or hardware modules that may execute some of the functionality described herein.

FIG. 1B is a diagram illustrating an exemplary server 110 with software and/or hardware modules that may execute some of the functionality described herein. The exemplary server 110 is shown with a service processing engine 104 performing or executing multiple modules: user interface module 140, user configuration module 142, control parameter module 144, machine learning model module 146, and a machine learning model distribution module 148.

Figure 5A:
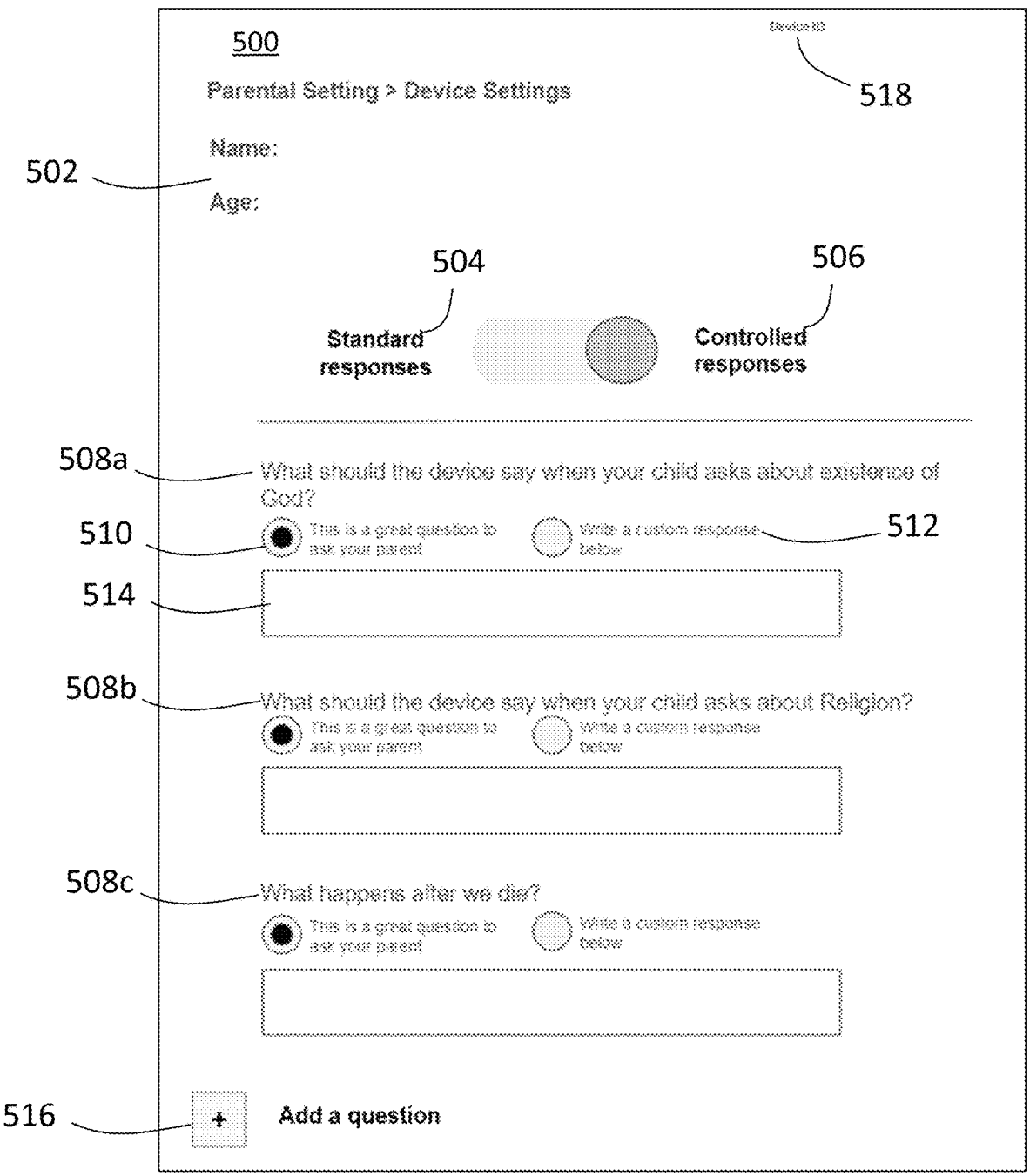
FIG. 5A is a diagram illustrating an exemplary user interface.
Figure 5B:
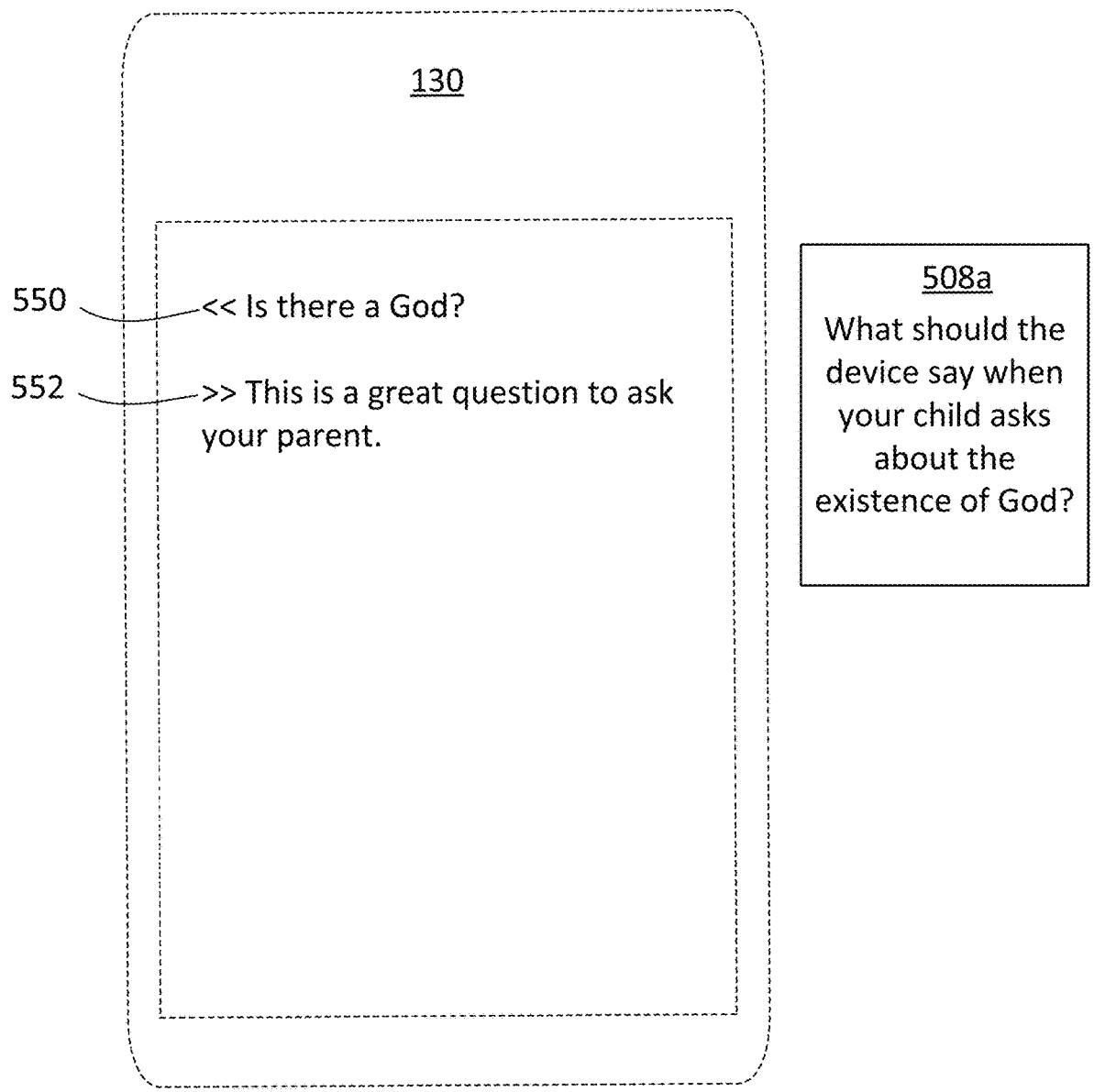
FIG. 5B is a diagram illustrating a user interface of a client device.
Figure 6:
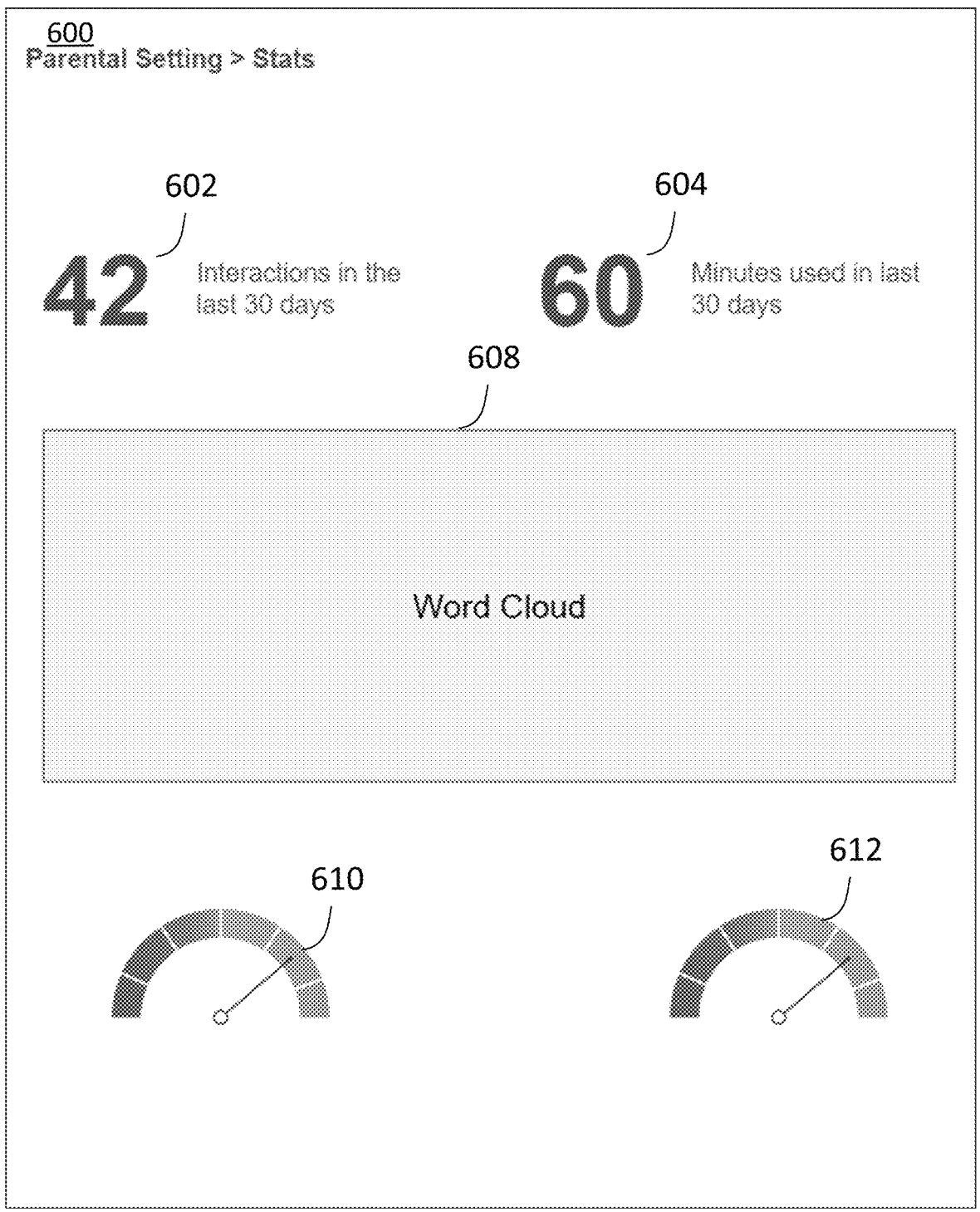
FIG. 6 is a diagram illustrating an exemplary user interface.

The user interface module 140 is configured with functionality to generate or provide one or more user interfaces, such to a web browser or an application operating on a computing device (e.g., the user interfaces of FIGS. 5 and 6. The user configuration module 142 is configured with functionality to receive and update the system and database with information about a primary user and a secondary user. Exemplary information that may be received and stored, via the user configuration information, includes an age or age range of the secondary user. The control parameter module 144 is configured with functionality to receive a primary's user control parameter selections, such as receiving control parameter inputs, updates deletions, etc. The machine learning model module 146 is configured with functionality to update one or more machine learning models that have previously been distributed to a client device for use by the secondary user. The machine learning model distribution module 148 is configured with functionality to distribute particular copies, instances or versions of a machine learning model from the system to a client device.

Figure 1C:
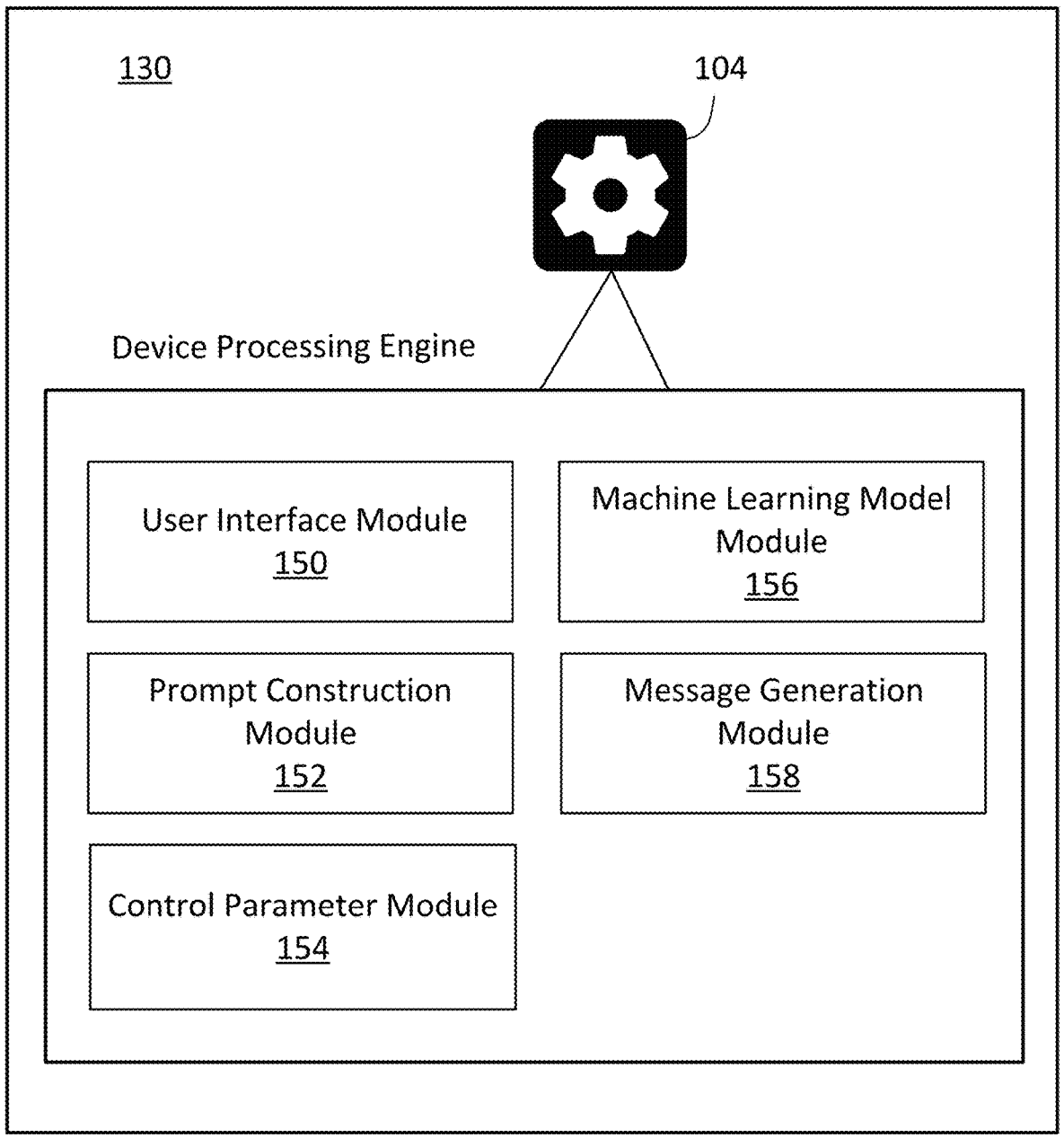
FIG. 1C is a diagram illustrating an exemplary computer system with software and/or hardware modules that may execute some of the functionality described herein.

FIG. 1C is a diagram illustrating an exemplary client device 130 with software and/or hardware modules that may execute some of the functionality described herein. The exemplary client device 130 is shown with the device processing engine 104 performing multiple modules: user interface module 150, prompt construction module 152, control parameter module 154, machine learning model module 156 and message generation module 158.

The user interface module 150 is configured with functionality to generate or provide one or more user interfaces, for the client device 130. The prompt construction module 152 is configured with functionality to receive and process one or more inputs, via the client device (such as a textual input asking a question, or multiple received inputs). The prompt construction module 152 assembles or constructs the received input for further processing. The control parameter module 154 evaluates the constructed prompt and determines whether one or more control parameters apply to the constructed prompt. The machine learning model module is configured with functionality to receive the constructed prompt and input the constructed prompt into the machine learning model 140, and receive an output generated by the machine learning model 140 based on the input of the constructed prompt. The message generation module 158 is configured with functionality to generate and display via the client device 130, control parameter response output based on one or more control parameters that apply to the constructed prompt.

Figure 2:
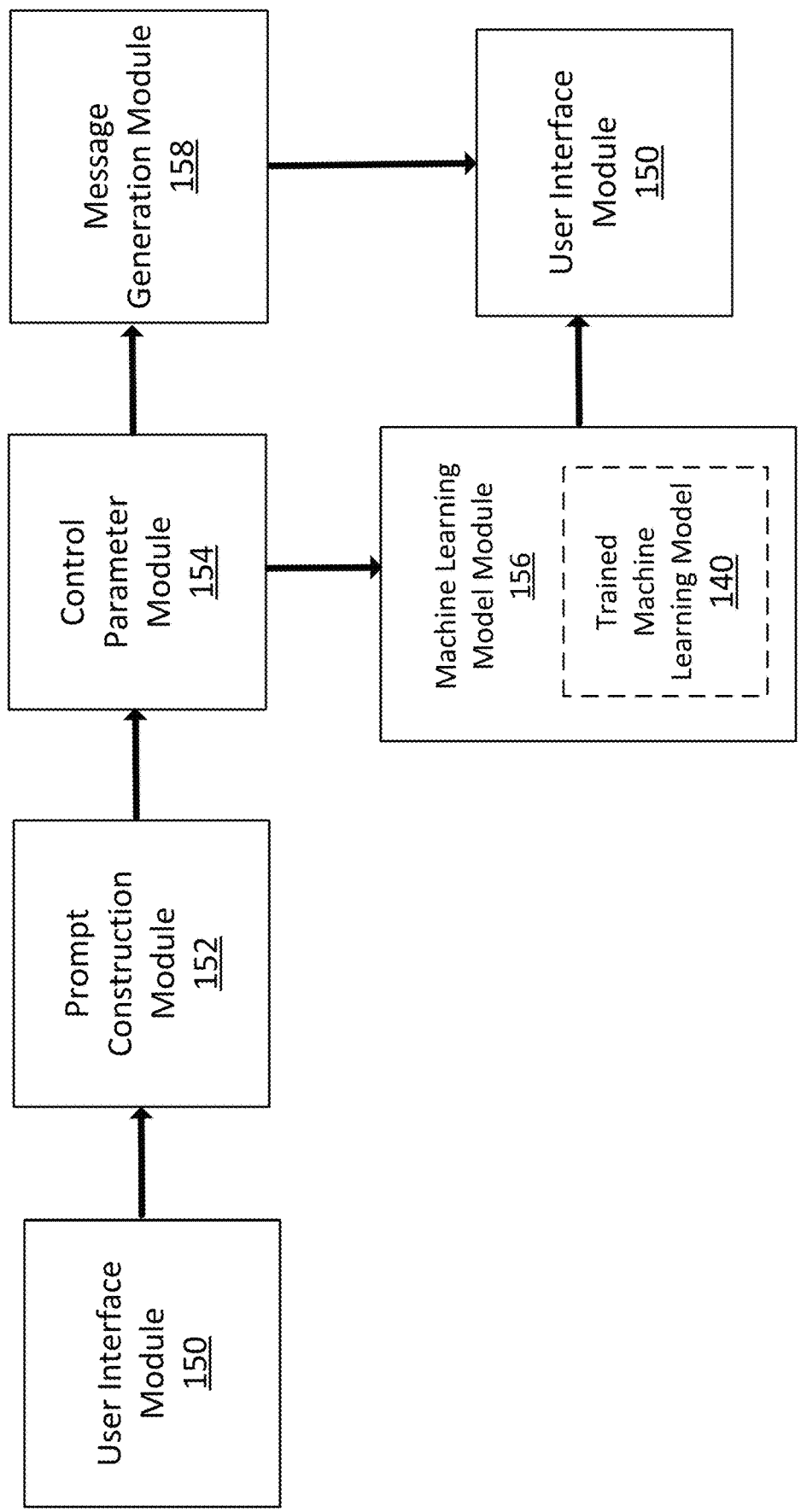
FIG. 2 is a flow chart illustrating an exemplary method that may be performed in some embodiments.

FIG. 2 is a flow chart illustrating an exemplary method 200 that may be performed in some embodiments. In some embodiments, the client device performs a process of evaluating an input received by the client device 130. Examples of inputs may be textual input or audio input converted to text (e.g., speech-to-text). The user interface module 150 generates a user interfaces, such as text or other graphics elements, providing a user interface portion where a user may enter a question or other queries that would be evaluated by the trained machine learning model 140. The prompt construction module 152 assembles or constructs a prompt from the received input(s). The control parameter module then evaluates or determines whether one or more predefined control parameters apply to or are relevant to the constructed prompt. For example, the client device 130, via the device processing engine 104, evaluates if an entered question may be considered to be a topic, that is restricted or otherwise, should not be input into the trained machine learning model 140. In some embodiments, if any control parameters apply to the received input then, the client device 130, generates a predefined control parameter response via message generation module 158. Information about the control parameter response is then handled by the user interface module 150 for display via the client device 130. However, if none of the control parameters apply to the received input then, the constructed prompt is input, via the machine learning model module 156, to the trained machine learning model 140. The output generated via the machine learning model 140 is then handled by the user interface module 150 and the generated output is displayed via a user interface of the client device 130.

While the foregoing describes the evaluation of the constructed prompt prior to input into the machine learning model 140, in some embodiments, the machine learning model may be configured with the control parameters such that the machine learning model 140 itself determines whether any one or more control parameters apply. For example, the machine learning model in the form of a generative AI model may be preloaded with the control parameters. This may be done via the service processing engine 102 prior to distributing the machine learning model to the client device 130. Alternatively, the client device may receive the control parameters and load the control parameters into the machine learning model 140.

In this alternative embodiment, a constructed prompt is input directly into the machine learning model, and the machine learning model 140 determines if any of the loaded control parameters apply. If they do apply, then the respective control parameter response would be generated as output by the machine learning model 140. If they do not apply, the machine learning model would process the input prompt, and generate a response based on the input prompt.

Figure 3:
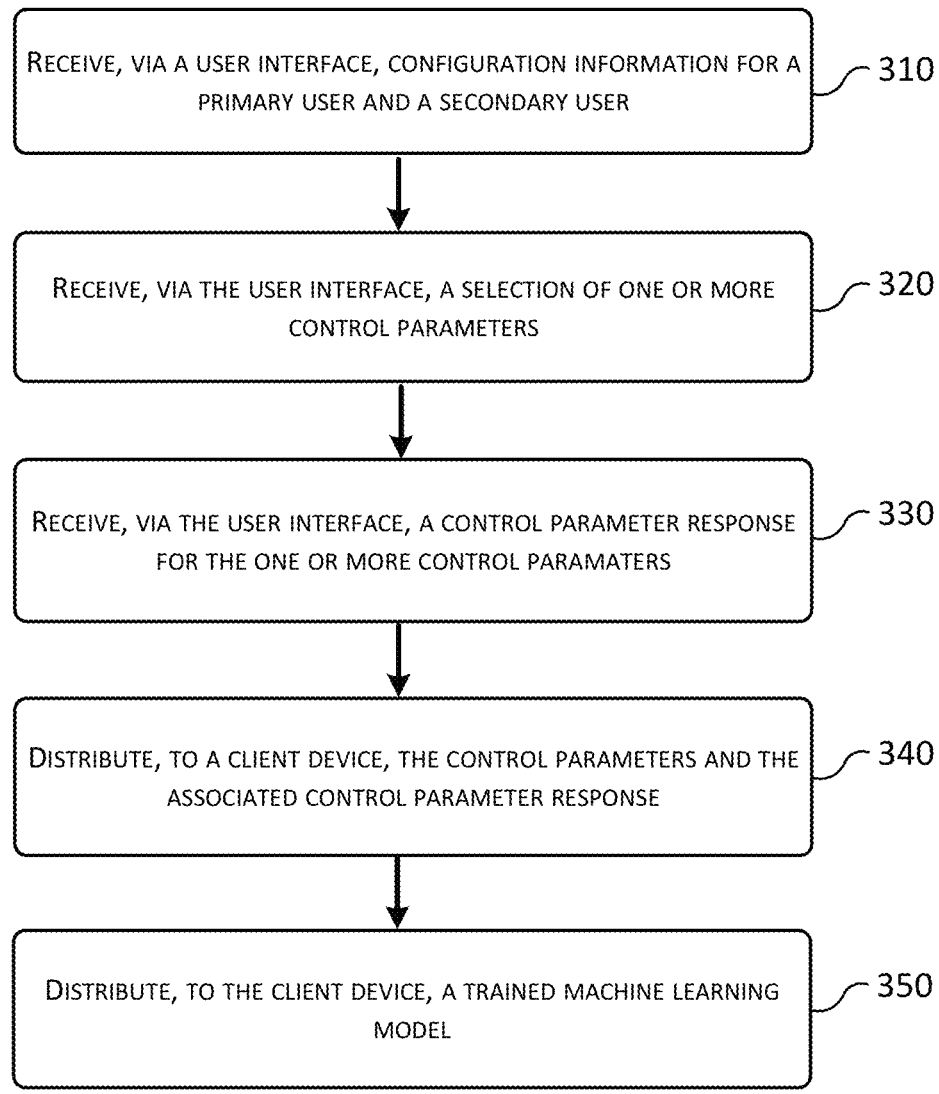
FIG. 3 is a flow chart illustrating an exemplary method that may be performed in some embodiments.

FIG. 3 is a flow chart illustrating an exemplary method 300 that may be performed in some embodiments. The method illustrates operations of a server performing functionality for the creation and distribution of control parameters and a machine learning model to a client device.

In step 310, the server receives, via a user interface, configuration information for a primary user and a secondary user. For example, the primary user may be a user, such as a parent or guardian, that would like a secondary user, such as a child or teenager to use a generative AI model, such as a large language model. The configuration information of the secondary user may include an age or an age range of the secondary user. The configuration information of the secondary user may also include topics that primary user would like the secondary user to have loaded into a machine learning model.

In step 320, the server receives, via a user interface, a selection of one or more control parameters. The control parameters may be in the form of text or rules that apply to topics or specific language or words. The control parameters are later provided to a client device that is to be used by the secondary user.

In step 330, the server receives, via a user interface, a control parameter response to be associated with a control parameter. In operation, the client device would determine if a particular control parameter applies to one or more inputs received by the client device. If so, then the control parameter response would be displayed by the client device.

In step 340, the server distributes to a client device, the control parameters and the control parameter responses that were created by the primary user.

In step 350, the server distributes to the client device a trained machine learning model (such as an LLM) to the client device. The client device would use the control parameters to control the input and to the machine learning model.

Figure 4:
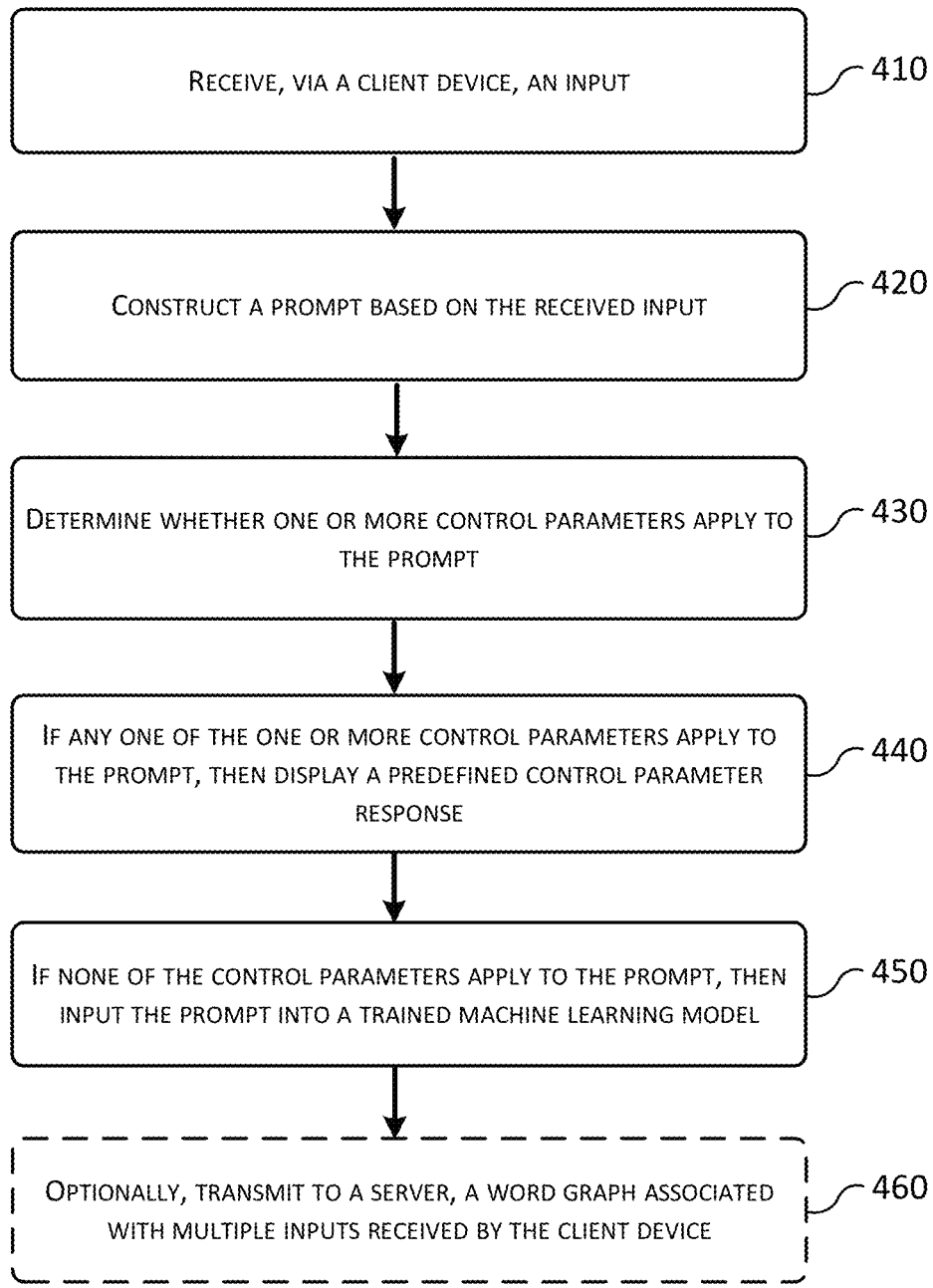
FIG. 4 is a flow chart illustrating an exemplary method that may be performed in some embodiments.

FIG. 4 is a flow chart illustrating an exemplary method 400 that may be performed in some embodiments. The method illustrates operations of a client device performing functionality for access control of machine learning model. The client device receives one or more controls parameters and one or more machine learning models (such as an LLM).

In step 410, the client device receives an input (such as one more textual inputs via a user interface).

In step 420, the client device constructs a prompt based on the received input. The client device may use one or more received input to construct a prompt to be input to the trained machine learning model.

In step 430, the client device determines whether one or more control parameters apply to the prompt. In some embodiments, the client device 130 determines whether the one or more control parameters applies comprises by determining whether one or more words of the received input match one or more words of the one or more control parameters. In other embodiments, the client device 130 determines whether the one or more control parameters applies by determining a similarity score of the received input to one or more words of the one or more control parameters; and determining that a control parameter applies if the similarity score is above a predefined confidence level.

In step 440, the client device determines if any one of the control parameters apply to the prompt, and then displays a predefined control parameter response. In some embodiments, the predefined control parameter response is a textual message to be displayed by the client device where its associated control parameter applies to the prompt.

In step 450, where the client device determines that none of the control parameters apply to the prompt, the prompt is provided as an input to the machine learning model. The machine learning model processes the received input and then generates a responsive output that is then displayed via the client device.

In step 460, the client device optionally transmits to a server a word graph associated with multiple inputs received by the client device. In some embodiments, the client device determines a topical context of the multiple inputs by evaluating the words of the multiple inputs. In such a case, the client device would not send the specific text of the multiple inputs to the server. This provides a level of anonymity as to the specific questions or inputs of the secondary user into the client device.

FIG. 5A is a diagram illustrating an exemplary user interface 500. In some embodiments, the server 110 may generate for display one or more user interfaces allowing a primary user to provide user configuration information and/or control parameter settings. In the example, the user interface allows for the input 502 of a name of a secondary user and an age (or age range).

The user interface 504, via a toggle switch, provides for the selection of standard control parameter responses 504 or curated/controlled responses 506. The standard responses include a preset response for all control parameters, such as the response of "This is a great question to ask your parent".

Example of control parameters are indicated by the elements 508a, 508b and 508c. In these examples, the control parameters comprise a listing of control parameters in the form of questions. The user interface 500 provides functionality allowing the primary user to select a standard response 510, or to select an option for a curated response 512. For example, for the control parameter 508a, the primary user may select the standard response "This is a great question to ask your parent." Alternatively, the primary user may select to write a custom response 512. If the primary user selects to write a custom response, then the input field 514 is enabled allowing the input, via the user interface 500, of a curated response. For example, the primary user may want to have a specific control parameter response displayed via the client device in response to the application of control parameter 508a by the client device 130. In this example, the primary user may want to provide a control parameter response about a particular religious belief or something different.

The user interface 500 provides for the addition of additional control parameters via the icon 516. The additional control parameters may be deleted or removed by the primary user.

These control parameters may be associated with a primary user identifier, a secondary user identifier, a device identifier 518, and/or a combination of any of the foregoing identifiers. The system may store the control parameters in a database, such as the control parameter database 132.

The control parameters are distributed, from the server 110 to the client device 130. The client device then uses the control parameters to control access and/or input to a trained machine learning model 140. The control parameters may be sent, via the server, in the form of a file or other data format to the client device. Over the course of time, the control parameters may be updated, modified or changed via the user interface 500, thereby creating a revised set of control parameters. The revised sent of control parameters may be sent, via the server to the client device.

In some embodiments, prior to distributing the control parameters form the server 110 to the client device 130, the server may remove words or tokens from the control parameter that are not needed to determine whether the control parameter applies to an input received via the client device. For example, a control parameter may be added by the primary user about 'What is the punishment for breaking a law." The server may remove non-key words from the control parameter, such as extracting the words or tokens to a list of the words "punishment", 'breaking" and "law". The system may evaluate the control parameter (e.g., a sentence) for articles, prepositions and other phrases that are unnecessary for the client device to determine if the control parameter applies to an input received by the client device 130.

FIG. 5B is a diagram illustrating a user interface of a client device. A secondary user may enter an input into the client device 130, such as the query or question "Is there a God?" 550. In some embodiments, client device 130 will perform a semantic similarity comparison with one or more predefined control parameters. In this example, the client device determines that the input question 550 is similar to the control parameter 508a "What should the device say when your child asks about the existence of God?" As noted in FIG. 5A, this control parameter has the control parameter response of "This is a great question to ask your parent." The client device then in response to the input to the client device 130 provide as an output 552 to the client device 130 the control parameter response "This is a great question to ask your parent." In this case, where the client device 130 determines an applicable control parameter, the device does not provide the input as a prompt to the machine learning model.

While embodiments are described as the client device 130 receiving one or more control parameters and associated control parameter responses, and one or more trained machine learning models, in some embodiments the client device 130 serves as a dumb terminal to primarily receive user input and display output. In this embodiment, the inputs received by the client device 130 are transmitted to the server 110, where the server performs the similarity evaluation of the input to the predefined control parameters. The server 110 then may provide to the client device 130 an applicable control parameter response, that is then displayed by the client device 130. Furthermore, the server 110, may receive the input from the client device 130 and construct a prompt to be input to one or more trained machine learning models. The server 110 then receives the output from the one or more trained machine learning models and provides the generated output (such as text data, image data, or sound data) to the client device, where the client device then display the generated output and/or plays the sound data to the secondary user.

FIG. 6 is a diagram illustrating an exemplary user interface 600. In some embodiments, the client device 130 intermittently sends or transmits to the server, a word graph or word tree related to the input received by the client device. The server may determine based on the received word graph or word tree, that the secondary user has an interest in a topic of information. The server may apply data related to the topic to a copy of the machine learning model that was distributed to the client device. The server may store specific machine learning models that have been updated with information. These specific machine learning models may be associated to a primary user identifier and/or a second user identifier. In some embodiments, the system must receive approval by the primary user, before the system distributes the updated machine learning model to the client device.

The system may generate the user interface 600 depicting a number of interactions 602 via the client device by the secondary user. A total number of minutes used over a particular time period 604, such as a number of minutes used for a number of days. The client device may tally or maintain a counter of such interactions and usage history and provide this information to the server 110.

The system may generate and present a word cloud 608 depicting words about the inputs made by the secondary user into the client device. The word cloud may show words in different sizes and positions indicating a relevancy or importance of a particular word or a particular topic context. The topic context may be generated based on multiple inputs received by the client device.

In some embodiments, the user interface 600 may generate one or more graphs 610, 612 that depict an amount of interactions 610 and an amount of minutes used 612. The graphs show a relative increase or relative decrease of the client device over a period of time. The graph value may be determined based on a total number of inputs received by the client device over a particular time period (such as 30 days).

Figure 7:
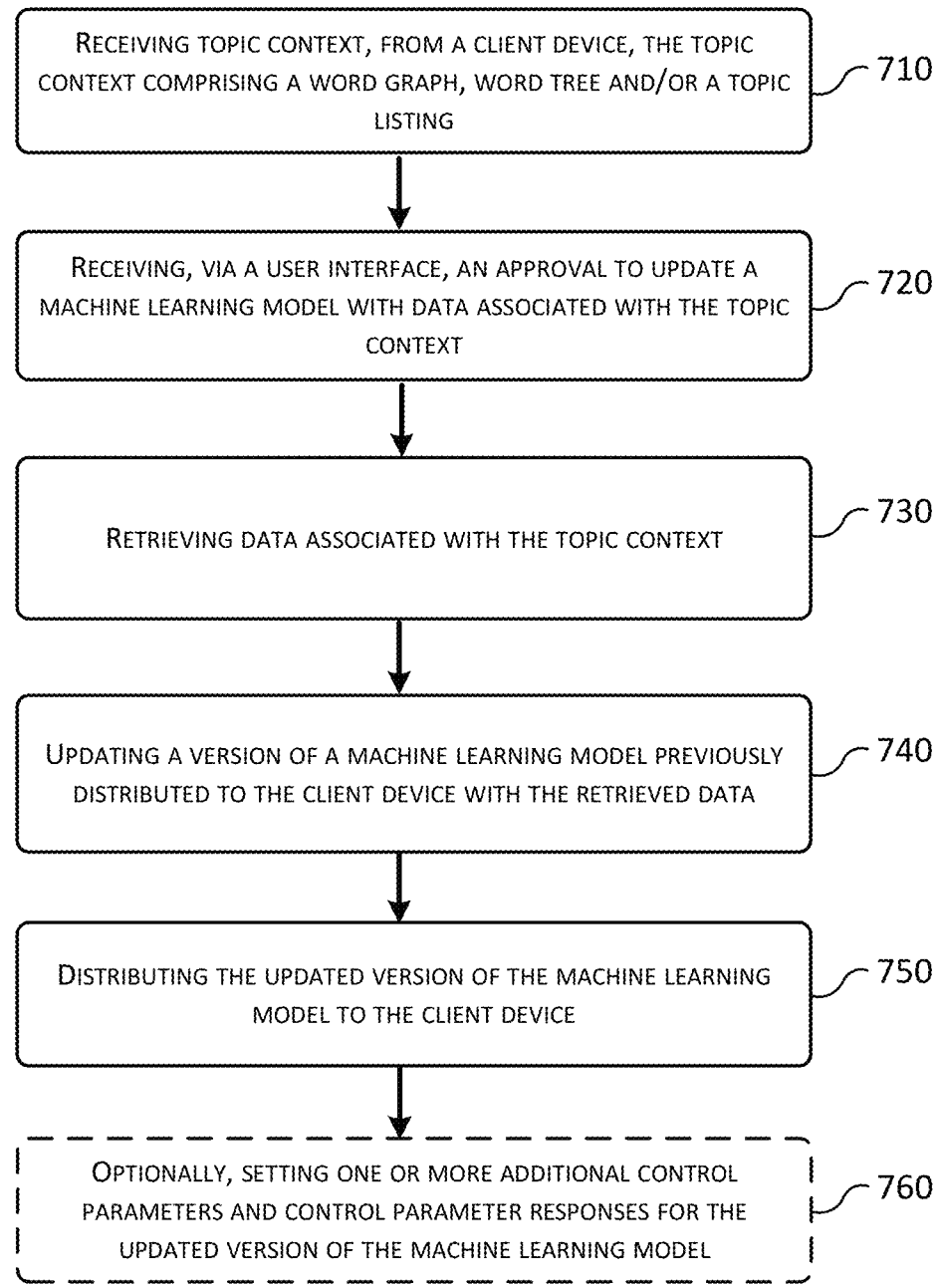
FIG. 7 is a flow chart illustrating an exemplary method that may be performed in some embodiments.

FIG. 7 is a flow chart illustrating an exemplary method 700 that may be performed in some embodiments. The method illustrates operations of the server obtaining data or electronic information from various data sources and updating or training a machine learning model. The system may be configured to retrieve data from external system sources, such as other websites or external databases, and/or be configured to automatically search different web sites to find age appropriate information based on the topic context.

In step 710, the server 110 receives topic context from the client device 130. The topic context may comprise a word graph, word tree and or a topic listing. The system may automatically update a trained machine learning model based on the topic context.

In step 720, the server 110, receives via a user interface, an approval to update a machine learning model with the data associated with the topic context.

In step 730, the server retrieves data associated with the topic context. For example, the topic context may indicate that the secondary user has been asking questions about the topic of cats (e.g., 'How do you feed a cat', 'Are cats good pets to have', etc.). Based on the inputs to the client device, the client device may determine a topic context of "CATS". The system may retrieve data regarding the topic of CATS.

In step 740, the server may update, using the retrieved data, a version of the machine learning model previously distributed to the client device. For example, a basis information large language model may have been previously distributed to the client device. The system may update or train a version of the base large language model with the retrieved data. In this example, the system would update or train the large language with the data about cats.

In step 750, this updated version of the large language model would then be distributed to the client device 130 for use by the secondary user.

In step 760, optionally the system may receive one or more additional control parameters and control parameter responses for the updated version of the machine learning model. For example, the primary user may want to set up a control parameter regarding procreation for cats.

This method provides for the identification of topics of interest by the secondary user, and providing functionality to update or train, in a controlled manner by a primary user, a prior version of a machine learning model with data relevant to the topic of interest.

FIG. 8 is a diagram illustrating an exemplary user interface 800. In some embodiments, the server may generate a user interface 800 configured with functionality allowing the primary user options to select from among multiple interest modules. In some embodiments, a particular interest module corresponds to a specific trained machine learning model (such as a large language model) that has been trained with information and data specific to the topic. For example, the system may have trained and store on a storage device a trained large language model have data specific to 1) animals and their habitats, another for 2) dinosaurs and prehistoric life, another for 3) space, planets and the universe, etc.

The user interface 800 provides for the selection of the various predefined interest modules and the associated trained large language model. In the example, the primary user has selected items 9, 16 and 22 (802, 804, 806.) In some embodiments, in response to this selection, the system would transmit a copy of the corresponding trained machine learning model to the client device 130. This functionality allows the primary user the functionality to curate a grouping of particular trained machine learnings model that the primary user would like to provide for access to the secondary user. In some embodiments, the user input from the client device may be sent to the server and applied as a prompt to the one or more selected trained machine learning models.

Each of the selected trained machine learning models may have an associated list of predefined control parameters specific to the selected trained machine learning model. Moreover, the primary user may add additional control parameters for a specific trained machine learning model (such as the items 1-30). In this case, the system would evaluate an input for a control parameter for applicability to the specific trained machine learning model. In some embodiments, the control parameters as described in FIG. 5A may act as global control parameters. The system may evaluate specific control parameters where an input is to be provided as a prompt to one of the specific trained machine learning models. For example, the system may evaluate a received input from the client device 130 and first determine if any of the global control parameters apply to the input. If so, the associated control parameter response would be displayed via the client device. If none of the global control parameters apply, then the system would determine if the input would be used as a prompt for any of the specific trained machine learning models. The system would determine if a control parameter applies to a specific trained machine learning model, and if so, the associated control parameter response would be displayed via the client device.

In some embodiments, the system determines a similarity of the input to a description of the particular preselected interest modules to determine if an input of the client device is to be used as a prompt for the trained machine learning model associated with the interest module. In other words, the system may identify based on the input of the client device 130 which of the trained machine learning models would be appropriate for responding to the received input. The system identifies which of the preselected trained machine learning models to use, and the evaluates for any application control parameters for the specific preselected trained machine learning model. If none of the control parameters (both global and specific) apply, then a prompt is constructed based on the input from the client device 130 and provided as an input to the specific preselected trained machine learning model where an output is generated and then provided for display by the client device 130.

In some embodiments, the received input from the client device 130 is provided as a prompt to each of the preselected trained machine learning models where an output is generated an each generated output is then provided for display by the client device 130.

Figure 9:
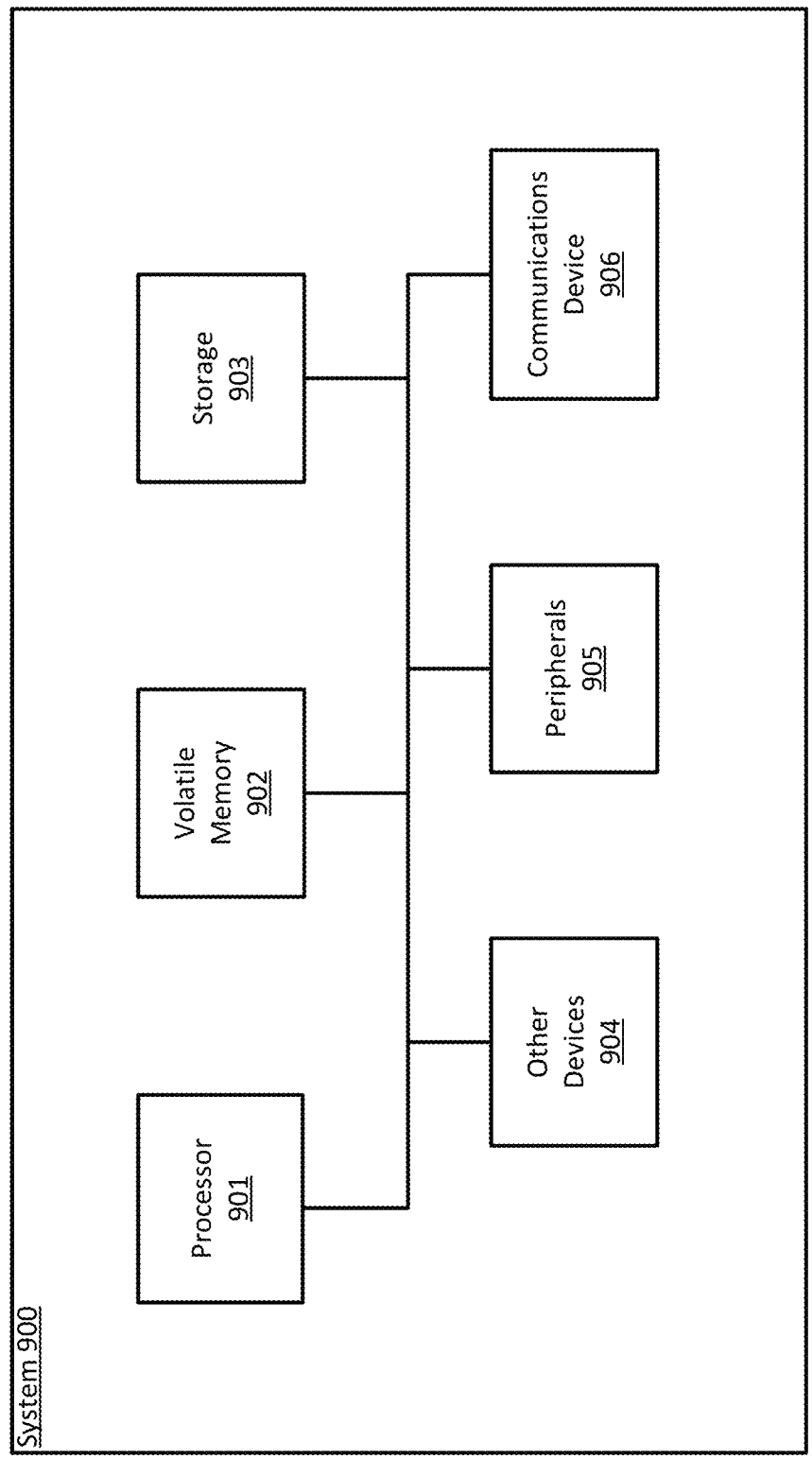
FIG. 9 is a diagram illustrating an exemplary computer that may perform processing in some embodiments.

FIG. 9 is a diagram illustrating an exemplary computer that may perform processing in some embodiments. Exemplary computer 900 may perform operations consistent with some embodiments. The architecture of computer 900 is exemplary. Computers can be implemented in a variety of other ways. A wide variety of computers can be used in accordance with the embodiments herein.

Processor 901 may perform computing functions such as running computer programs. The volatile memory 902 may provide temporary storage of data for the processor 901. RAM is one kind of volatile memory. Volatile memory typically requires power to maintain its stored information. Storage 903 provides computer storage for data, instructions, and/or arbitrary information. Non-volatile memory, which can preserve data even when not powered and including disks and flash memory, is an example of storage. Storage 903 may be organized as a file system, database, or in other ways. Data, instructions, and information may be loaded from storage 903 into volatile memory 902 for processing by the processor 901.

The computer 900 may include peripherals 905. Peripherals 905 may include input peripherals such as a keyboard, mouse, trackball, video camera, microphone, and other input devices. Peripherals 905 may also include output devices such as a display. Communications device 906 may connect the computer 900 to an external medium. For example, communications device 906 may take the form of a network adapter that provides communications to a network. A computer 900 may also include a variety of other devices 904. The various components of the computer 900 may be connected by a connection medium such as a bus, crossbar, or network.

It will be appreciated that the present disclosure may include any one and up to all of the following examples.

Example 1: A system comprising at least one processor configured to perform the operations of: displaying, via a user interface, a list comprising available control parameters that are selectable for use to control an input to a trained machine learning model; receiving, via the user interface, a selection of one or more control parameters from the list for control of the input to the trained machine learning model; distributing configuration information of the selected one or more control parameters to a client device; receiving an input via the client device, the client device having an instance of the trained machine learning model; and determining whether the one or more control parameters applies to the received input and performing the operations of: if any of the one or more control parameters applies to the received input then: displaying, via the client device, a predefined control parameter response; and if none of the control parameters apply to the received input then: providing as an input prompt, the received input, to the trained machine learning model; and displaying, via the client device, an output generated by the trained machine learning model based in the input prompt Example 2. The system of Example 1, wherein the control parameters include a predetermined listing of questions, wherein the user interface is configured to enable or disable the selection of a particular question listed via the user interface.

Example 3. The system of any one of Examples 1-2, further comprising the operations of: training the machine learning model with one or more data sets configured for a predetermined user age range, the machine learning model comprising an LLM; and distributing the trained machine learning model to a client device.

Example 4. The system of any one of Examples 1-3, further comprising the operations of: receiving, via a user interface, an input for an age or an age range of a primary user of the client device; and selecting, based on the input age or age range, the trained machine learning model from a group of trained machine learning models, where each of the models are associated with an age range.

Example 5. The system of any one of Examples 1-4, further comprising the operations of: determining an updated age or updated age range of the primary user; and selecting, based on the updated age or updated age range, the another trained machine learning model from a group of trained machine learning models, where each of the models are associated with an age range; and distributing the another trained machine learning model to a client device.

Example 6. The system of any one of Examples 1-5, further comprising the operations of: receiving, via a user interface, a textual input describing the predefined control parameter response for each of the selected one or more control parameters.

Example 7. The system of any one of Examples 1-6, further comprising the operations of: receiving an input via the user interface to add one or more additional control parameters.

Example 8. The system of any one of Examples 1-7, wherein the determining whether the one or more control parameters applies comprises: determining whether one or more words of the received input match one or more words of the one or more control parameters.

Example 9. The system of any one of Examples 1-8, wherein the determining whether the one or more control parameters applies comprises: determining a similarity score of the received input to one or more words of the one or more control parameters; and determining that a control parameter applies if the similarity score is above a predefined confidence level.

Example 10. The system of any one of Examples 1-9, further comprising the operations of: receiving, from the client device, one or more word graph associated with the input received by the client; and providing for display a user interface depicting the word graph.

Example 11. The system of any one of Examples 1-10, further comprising the operations of: determining whether to update the machine learning model with information associated with the context of the word graph; and receiving a confirmation to update the machine learning model; obtaining content or data associated with the context; updating the machine learning model; and distributing the machine learning model with the obtained content or data.

Example 12: A method comprising the operations of: displaying, via a user interface, a list comprising available control parameters that are selectable for use to control an input to a trained machine learning model; receiving, via the user interface, a selection of one or more control parameters from the list for control of the input to the trained machine learning model; distributing configuration information of the selected one or more control parameters to a client device; receiving an input via the client device, the client device having an instance of the trained machine learning model; and determining whether the one or more control parameters applies to the received input and performing the operations of: if any of the one or more control parameters applies to the received input then: displaying, via the client device, a predefined control parameter response; and if none of the control parameters apply to the received input then: providing as an input prompt, the received input, to the trained machine learning model; and displaying, via the client device, an output generated by the trained machine learning model based in the input prompt Example 13. The method of Example 12, wherein the control parameters include a predetermined listing of questions, wherein the user interface is configured to enable or disable the selection of a particular question listed via the user interface.

Example 14. The method of any one of Examples 12-13, further comprising the operations of: training the machine learning model with one or more data sets configured for a predetermined user age range, the machine learning model comprising an LLM; and distributing the trained machine learning model to a client device.

Example 15. The method of any one of Examples 12-14, further comprising the operations of: receiving, via a user interface, an input for an age or an age range of a primary user of the client device; and selecting, based on the input age or age range, the trained machine learning model from a group of trained machine learning models, where each of the models are associated with an age range.

Example 16. The method of any one of Examples 12-15, further comprising the operations of: determining an updated age or updated age range of the primary user; and selecting, based on the updated age or updated age range, the another trained machine learning model from a group of trained machine learning models, where each of the models are associated with an age range; and distributing the another trained machine learning model to a client device.

Example 17. The method of any one of Examples 12-16, further comprising the operations of: receiving, via a user interface, a textual input describing the predefined control parameter response for each of the selected one or more control parameters.

Example 18. The method of any one of Examples 12-17, further comprising the operations of: receiving an input via the user interface to add one or more additional control parameters.

Example 19. The method of any one of Examples 12-18, wherein the determining whether the one or more control parameters applies comprises: determining whether one or more words of the received input match one or more words of the one or more control parameters.

Example 20. The method of any one of Examples 12-19, wherein the determining whether the one or more control parameters applies comprises: determining a similarity score of the received input to one or more words of the one or more control parameters; and determining that a control parameter applies if the similarity score is above a predefined confidence level.

Example 21. The method of any one of Examples 12-20, further comprising the operations of: receiving, from the client device, one or more word graph associated with the input received by the client; and providing for display a user interface depicting the word graph.

Example 22. The method of any one of Examples 12-21, further comprising the operations of: determining whether to update the machine learning model with information associated with the context of the word graph; and receiving a confirmation to update the machine learning model; obtaining content or data associated with the context; updating the machine learning model; and distributing the machine learning model with the obtained content or data.

Some portions of the preceding detailed descriptions have been presented in terms of algorithms, equations and/or symbolic representations of operations on data bits within a computer memory. These algorithmic and/or equation descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "identifying" or "determining" or "executing" or "performing" or "collecting" or "creating" or "sending" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage devices.

The present disclosure also relates to an apparatus for performing the operations herein. This apparatus may be specially constructed for the intended purposes, or it may comprise a general-purpose computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

Various general-purpose systems may be used with programs in accordance with the teachings herein, or it may prove convenient to construct a more specialized apparatus to perform the method. The structure for a variety of these systems will appear as set forth in the description above. In addition, the present disclosure is not described with reference to any programming language. It will be appreciated that a variety of programming languages may be used to implement the teachings of the disclosure as described herein.

The present disclosure may be provided as a computer program product, or software, that may include a machine-readable medium having stored thereon instructions, which may be used to program a computer system (or other electronic devices) to perform a process according to the present disclosure. A machine-readable medium includes any mechanism for storing information in a form readable by a machine (e.g., a computer). For example, a machine-readable (e.g., computer-readable) medium includes a machine (e.g., a computer) readable storage medium such as a read only memory ("ROM"), random access memory ("RAM"), magnetic disk storage media, optical storage media, flash memory devices, etc.

In the foregoing disclosure, implementations of the disclosure have been described with reference to specific example implementations thereof. It will be evident that various modifications may be made thereto without departing from the broader spirit and scope of implementations of the disclosure as set forth in the following claims. The disclosure and drawings are, accordingly, to be regarded in an illustrative sense rather than a restrictive sense.

What is claimed is:

1. A system comprising at least one processor configured to perform the operations of:
    displaying, via a user interface, a list comprising available control parameters that are selectable for use to control an input to a trained machine learning model;
    receiving, via the user interface, a selection of one or more control parameters from the list for control of the input to the trained machine learning model;
    distributing configuration information of the selected one or more control parameters to a client device;
    receiving an input via the client device, the client device having an instance of the trained machine learning model;

determining whether the one or more control parameters applies to the received input and performing the operations of:
if any of the one or more control parameters applies to the received input then:
displaying, via the client device, a predefined control parameter response; or
if none of the control parameters apply to the received input then:
providing as an input prompt, the received input, to the trained machine learning model; and
displaying, via the client device, an output generated by the trained machine learning model based in the input prompt.

2. The system of claim 1, wherein the control parameters include a predetermined listing of questions, wherein the user interface is configured to enable or disable the selection of a particular question listed via the user interface.

3. The system of claim 1, further comprising the operations of:
training the machine learning model with one or more data sets configured for a predetermined user age range, the machine learning model comprising an LLM; and
distributing the trained machine learning model to a client device.

4. The system of claim 1, further comprising the operations of:
receiving, via a user interface, an input for an age or an age range of a primary user of the client device; and
selecting, based on the input age or age range, the trained machine learning model from a group of trained machine learning models, where each of the models are associated with an age range.

5. The system of claim 4, further comprising the operations of:
determining an updated age or updated age range of the primary user; and
selecting, based on the updated age or updated age range, the another trained machine learning model from a group of trained machine learning models, where each of the models are associated with an age range; and
distributing the another trained machine learning model to a client device.

6. The system of claim 1, further comprising the operations of:
receiving, via a user interface, a textual input describing the predefined control parameter response for each of the selected one or more control parameters.

7. The system of claim 1, further comprising the operations of:
receiving an input via the user interface to add one or more additional control parameters.

8. The system of claim 1, wherein the determining whether the one or more control parameter applies comprises:
determining whether one or more words of the received input match one or more words of the one or more control parameters.

9. The system of claim 1, wherein the determining whether the one or more control parameters applies comprises:
determining a similarity score of the received input to one or more words of the one or more control parameters; and
determining that a control parameter applies if the similarity score is above a predefined confidence level.

10. The system of claim 1, further comprising the operations of:
receiving, from the client device, one or more word graphs associated with the input received by the client; and
providing for display a user interface depicting the one or more word graphs.

11. The system of claim 10, further comprising the operations of:
determining whether to update the machine learning model with information associated with the context of the one or more word graphs;
receiving a confirmation to update the machine learning model;
obtaining content or data associated with the context;
updating the machine learning model; and
distributing the machine learning model with the obtained content or data.

12. A computer-implemented method comprising:
displaying, via a user interface, a list comprising available control parameters that are selectable for use to control an input to a trained machine learning model;
receiving, via the user interface, a selection of one or more control parameters from the list for control of the input to the trained machine learning model;
distributing configuration information of the selected one or more control parameters to a client device;
receiving an input via the client device, the client device having an instance of the trained machine learning model;
determining whether the one or more control parameters applies to the received input and performing the operations of:
if any of the one or more control parameters applies to the received input then:
displaying, via the client device, a predefined control parameter response; or
if none of the control parameters apply to the received input then:
providing as an input prompt, the received input, to the trained machine learning model; and
displaying, via the client device, an output generated by the trained machine learning model based in the input prompt.

13. The method of claim 12, wherein the control parameters include a predetermined listing of questions, wherein the user interface is configured to enable or disable the selection of a particular question listed via the user interface.

14. The method of claim 12, further comprising the operations of:
training the machine learning model with one or more data sets configured for a predetermined user age range, the machine learning model comprising an LLM; and
distributing the trained machine learning model to a client device.

15. The method of claim 12, further comprising the operations of:
receiving, via a user interface, an input for an age or an age range of a primary user of the client device; and
selecting, based on the input age or age range, the trained machine learning model from a group of trained machine learning models, where each of the models are associated with an age range.

16. The method of claim 15, further comprising the operations of:
determining an updated age or updated age range of the primary user; and selecting, based on the updated age or updated age range, the another trained machine learning model from a group of trained machine learning models, where each of the models are associated with an age range; and distributing the another trained machine learning model to a client device.

17. The method of claim 12, further comprising the operations of:

receiving, via a user interface, a textual input describing the predefined control parameter response for each of the selected one or more control parameters.

18. The method of claim 12, further comprising the operations of:

receiving an input via the user interface to add one or more additional control parameters.

19. The method of claim 12, wherein the determining whether the one or more control parameter applies comprises:

determining whether one or more words of the received input match one or more words of the one or more control parameters.

20. The method of claim 12, wherein the determining whether the one or more control parameters applies comprises:

determining a similarity score of the received input to one or more words of the one or more control parameters; and determining that a control parameter applies if the similarity score is above a predefined confidence level.

21. The method of claim 12, further comprising the operations of:

receiving, from the client device, one or more word graphs associated with the input received by the client; and providing for display a user interface depicting the one or more word graphs.

22. The system of claim 21, further comprising the operations of:

determining whether to update the machine learning model with information associated with the context of the one or more word graphs;

receiving a confirmation to update the machine learning model;

obtaining content or data associated with the context;

updating the machine learning model; and distributing the machine learning model with the obtained content or data.

* * * * *